(12) United States Patent
Kelly et al.

(10) Patent No.: US 10,409,349 B2
(45) Date of Patent: Sep. 10, 2019

(54) REMEDIATING POWER LOSS AT A SERVER

(71) Applicant: Microsoft Technology Licensing, LLC, Redmond, WA (US)

(72) Inventors: Bryan Kelly, Carnation, WA (US); Shaun L. Harris, College Station, TX (US); Mark A. Shaw, Sammamish, WA (US); Badriddine Khessib, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/048,362

(22) Filed: Feb. 19, 2016

(65) Prior Publication Data

US 2017/0242467 A1    Aug. 24, 2017

(51) Int. Cl.
| | | |
|---|---|---|
| *G06F 1/26* | (2006.01) | |
| *G06F 1/28* | (2006.01) | |
| *G06F 1/30* | (2006.01) | |
| *G06F 11/07* | (2006.01) | |
| *G06F 1/3203* | (2019.01) | |

(52) U.S. Cl.
CPC ............ *G06F 1/28* (2013.01); *G06F 1/30* (2013.01); *G06F 11/0709* (2013.01); *G06F 11/0757* (2013.01); *G06F 1/3203* (2013.01)

(58) Field of Classification Search
CPC ................................ G06F 1/3203; G06F 1/26
USPC .......................................................... 713/300
See application file for complete search history.

(56) References Cited

U.S. PATENT DOCUMENTS

| | | | | |
|---|---|---|---|---|
| 5,117,324 A | * | 5/1992 | Johnson, Jr. .............. | G06F 1/30 307/66 |
| 5,315,161 A | * | 5/1994 | Robinson ................. | G06F 1/30 307/66 |
| 5,566,339 A | | 10/1996 | Perholtz et al. | |
| 5,592,675 A | * | 1/1997 | Itoh .......................... | G06F 1/24 365/222 |

(Continued)

OTHER PUBLICATIONS

"International Search Report and Written Opinion Issued in PCT Application No. PCT/US2017/018414", dated Jun. 2, 2017, 14 Pages.

(Continued)

*Primary Examiner* — Volvick Derose
(74) *Attorney, Agent, or Firm* — Buckley, Maschoff & Talwalkar LLC

(57) ABSTRACT

Aspects extend to methods, systems, and computer program products for remediating power loss at a server. Aspects of the invention increase the likelihood of gracefully shutting down a server and associated components in a data center when mains power is lost for a specified amount of time (e.g., an amount of time beyond transition to generator power). A server can include a management module (e.g., a BMC) and a watchdog module. When the management controller detects loss of power at a power supply unit, the management controller orchestrates a graceful shutdown of the server in response to power loss. When the management module is unresponsive, the watchdog module provides backup functionality for orchestrating a graceful shutdown in response to power loss. As such, data can be saved from RAM to more durable storage even when the management module is unresponsive.

21 Claims, 2 Drawing Sheets

(56) References Cited

U.S. PATENT DOCUMENTS

| | | | | |
|---|---|---|---|---|
| 5,781,770 | A * | 7/1998 | Byers | G06F 11/1438 713/502 |
| 5,918,059 | A * | 6/1999 | Tavallaei | G06F 1/26 713/300 |
| 5,923,099 | A * | 7/1999 | Bilir | G06F 1/30 307/64 |
| 6,718,488 | B1 * | 4/2004 | Jue | G06F 11/1417 710/110 |
| 7,127,633 | B1 * | 10/2006 | Olson | G06F 11/2092 714/4.4 |
| 7,739,529 | B2 | 6/2010 | Hardman et al. | |
| 7,962,458 | B2 | 6/2011 | Holenstein et al. | |
| 8,555,090 | B2 * | 10/2013 | Hagiwara | G06F 1/30 713/300 |
| 9,569,376 | B1 * | 2/2017 | Batchelor | G06F 13/102 |
| 2002/0069371 | A1 * | 6/2002 | Teeling | G06F 1/30 713/300 |
| 2002/0069373 | A1 * | 6/2002 | Zhuo | G06F 1/30 713/324 |
| 2002/0138772 | A1 * | 9/2002 | Crawford | G06F 1/30 713/300 |
| 2003/0033546 | A1 * | 2/2003 | Bresniker | G06F 1/18 713/300 |
| 2003/0188217 | A1 * | 10/2003 | Spiegel | G06F 9/442 714/4.1 |
| 2004/0070279 | A1 * | 4/2004 | Liu | H02J 9/061 307/64 |
| 2005/0097374 | A1 * | 5/2005 | Aharonian | G06F 1/30 713/300 |
| 2005/0210331 | A1 * | 9/2005 | Connelly | G06F 11/0709 714/26 |
| 2005/0255894 | A1 * | 11/2005 | Heller | G06F 9/442 455/572 |
| 2005/0267965 | A1 * | 12/2005 | Heller | H04L 41/00 709/224 |
| 2005/0283641 | A1 * | 12/2005 | Clark | G06F 11/2028 714/4.11 |
| 2006/0034251 | A1 * | 2/2006 | Sivabalan | H04L 45/00 370/351 |
| 2007/0210650 | A1 * | 9/2007 | Togashi | G06F 11/1441 307/43 |
| 2010/0007998 | A1 * | 1/2010 | Dishman | H02H 3/42 361/18 |
| 2010/0299548 | A1 * | 11/2010 | Chadirchi | G06F 1/263 713/340 |
| 2011/0016340 | A1 | 1/2011 | Sun et al. | |
| 2011/0072280 | A1 * | 3/2011 | Chiasson | G06F 1/30 713/300 |
| 2011/0179428 | A1 * | 7/2011 | Kakarla | G06F 9/5061 719/328 |
| 2012/0173899 | A1 * | 7/2012 | Swindell | G06F 1/266 713/310 |
| 2012/0173911 | A1 * | 7/2012 | Cerwinski | G06F 1/3203 713/340 |
| 2013/0083338 | A1 * | 4/2013 | Fahrenkrug | G06F 3/1221 358/1.13 |
| 2013/0198537 | A1 * | 8/2013 | Uehara | G06F 1/263 713/300 |
| 2014/0122906 | A1 * | 5/2014 | Whitted | H02J 9/061 713/300 |
| 2017/0142067 | A9 * | 5/2017 | Pietrowicz | G01R 1/20 |
| 2017/0299633 | A1 * | 10/2017 | Pietrowicz | H04L 63/0227 |
| 2017/0318087 | A1 * | 11/2017 | Qiu | H04L 41/082 |

OTHER PUBLICATIONS

Dell article, Information and ideas on Dell PowerEdge rack, tower and blade server solutions. Published Aug. 26, 2013, 7 pages.

* cited by examiner

REMEDIATING POWER LOSS AT A SERVER

CROSS-REFERENCE TO RELATED APPLICATIONS

Not Applicable.

BACKGROUND

1. Background and Relevant Art

Computer systems and related technology affect many aspects of society. Indeed, the computer system's ability to process information has transformed the way we live and work. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments. For example, distributed applications can have components at a number of different computer systems.

Within data centers, computing components can be mounted in racks to provide compute resources, storage resources, and network resources to $3^{rd}$ parties. Data centers can be have a variety of power backup options to provide a higher level of reliability. For example, data centers can include onsite generators as well as battery backups. However, in many data centers, the amount of time needed for onsite generators to reliably provide power exceeds the time components within the data can operate on battery backup. As such, battery backup power is often used to mitigate short lived transient power anomalies, such as, for example, temporary brownouts of external power.

Battery backup power can also be used to graceful shutdown components if longer lasting power anomalies are anticipated. For example, after a certain amount of time running on battery backup power, components can be gracefully powered off in anticipation of battery backup power being depleted. Then, when onsite generator power is available, components can be powered back on. When external power is restored, components can then be transitioned back to external power.

Individual servers within a data center can include a baseboard management controller (BMC). The BMC includes software responsible for management of a server, including monitoring and/or communicating with power supply units. The BMC is also responsible for determining when a graceful shutdown of associated components is appropriate (e.g., in anticipation of battery backup power being exhausted) and is responsible for handling the graceful shutdown.

However, since BMCs include software, there is always some chance of a BMC operating in an inappropriate and/or unintended manner. Further, BMC software may require updating from time to time. The BMC may be temporally taken offline when an update is in progress. If a power anomaly occurs when a BMC is being updated or when a BMC is operating in an inappropriate and/or unintended manner, a gracefully shutdown may not possible. If a server is not shutdown gracefully in response to a power failure, data stored in RAM or other volatile memory can be lost.

BRIEF SUMMARY

Examples extend to methods, systems, and computer program products for remediating power loss at a server. A system includes a power supply unit (PSU), a battery, and a computer system (e.g., a rack mounted server). The power supply unit receives alternating current (AC) or directed current (DC) input and provides direct current (DC) output at a specified direct current (DC) voltage. The battery provides the specified direct current (DC) voltage to provide backup power to components connected to the direct current output when problems providing the direct current output from the power supply unit (PSU) occur. In another aspect, the power supply unit receives direct current (DC) input (which may or may not be at the specified direct current (DC) voltage) and provides direct current (DC) output at the specified direct current (DC) voltage.

The computer system is connected to the power supply unit (PSU) and the battery. The computer system includes one or more processors, system memory, a management controller, and a watchdog module. The management controller monitors the status of the power supply unit (PSU). The management controller is configured to gracefully shut down the computer system when a problem with the power supply unit (PSU) is detected.

The watchdog module configured to start a timer when the problem with the power supply unit (PSU) is detected. The watchdog module is configured to gracefully shut down the computer system in response to expiration of the timer. The watchdog module is configured to abort the timer in response to communication from the management controller.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by practice. The features and advantages may be realized and obtained by means of the instruments and combinations particularly pointed out in the appended claims. These and other features and advantages will become more fully apparent from the following description and appended claims, or may be learned by practice as set forth hereinafter.

BRIEF DESCRIPTION OF THE DRAWINGS

In order to describe the manner in which the above-recited and other advantages and features can be obtained, a more particular description will be rendered by reference to specific implementations thereof which are illustrated in the appended drawings. Understanding that these drawings depict only some implementations and are not therefore to be considered to be limiting of its scope, implementations will be described and explained with additional specificity and detail through the use of the accompanying drawings in which.

DETAILED DESCRIPTION

Figure 1:
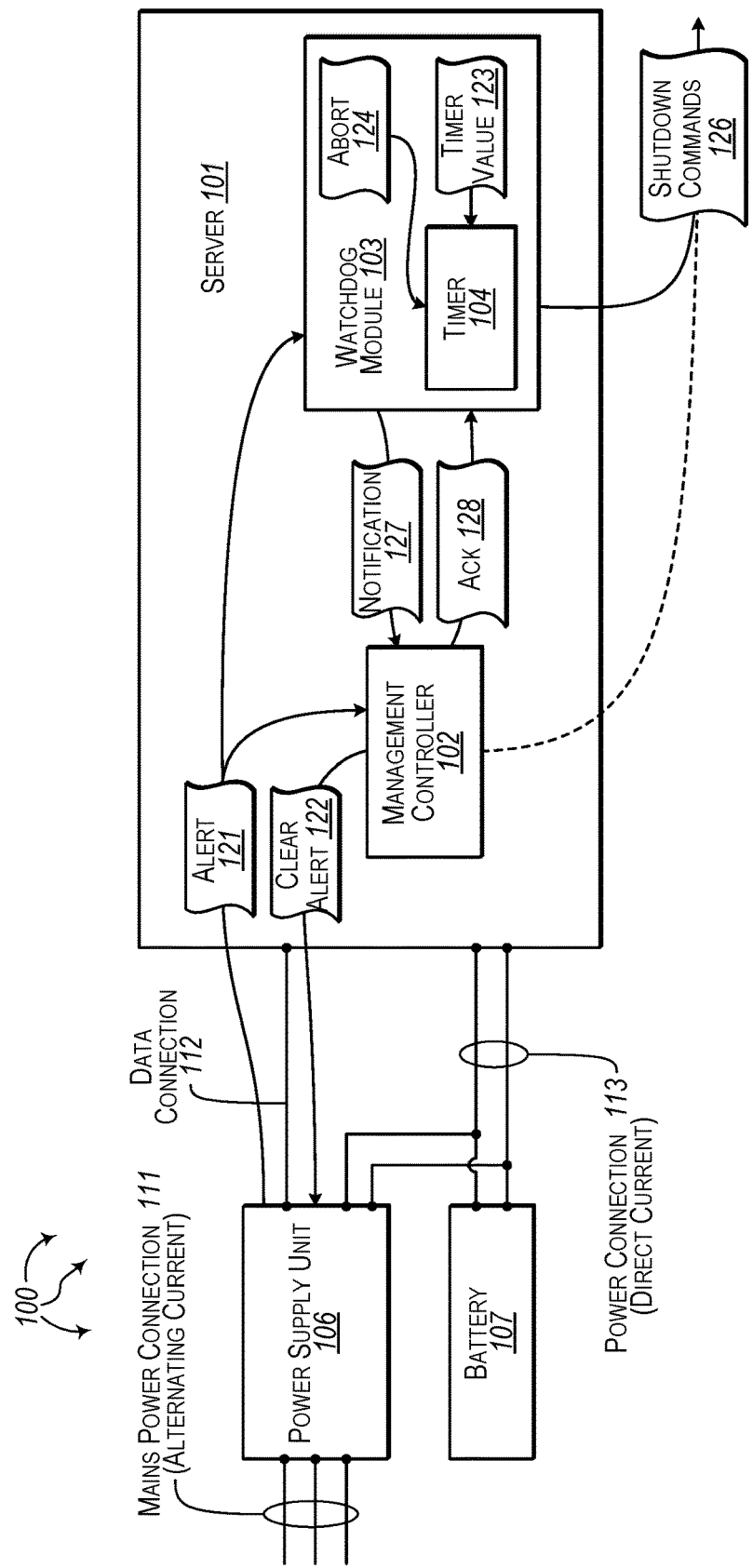
FIG. 1 illustrates an example architecture that facilitates remediating power loss at a server

Examples extend to methods, systems, and computer program products for remediating power loss at a server. A system includes a power supply unit (PSU), a battery, and a computer system (e.g., a rack mounted server). The power supply unit receives alternating current (AC) or direct current (DC) input and provides direct current (DC) output at a specified direct current (DC) voltage. The battery provides the specified direct current (DC) voltage to provide backup power to components connected to the direct current output when problems providing the direct current output from the power supply unit (PSU) occur. In another aspect, the power supply unit receives direct current (DC) input (which may or may not be at the specified direct current (DC) voltage) and provides direct current (DC) output at the specified direct current (DC) voltage.

The computer system is connected to the power supply unit (PSU) and the battery. The computer system includes one or more processors, system memory, a management controller, and a watchdog module. The management controller monitors the status of the power supply unit (PSU). The management controller is configured to gracefully shut down the computer system when a problem with (e.g., an alert from) the power supply unit (PSU) is detected.

The watchdog module is configured to start a timer when the problem with the power supply unit (PSU) is detected. The watchdog module is configured to gracefully shut down the computer system in response to expiration of the timer. The watchdog module is configured to abort the timer in response to communication from the management controller.

Accordingly, the watchdog module can gracefully shutdown the computer system when the management controller fails to respond to a problem with the power supply unit. When the management controller indicates awareness of the problem with the power supply unit, the watchdog module permits the management controller to handle the problem.

Implementations may comprise or utilize a special purpose or general-purpose computer including computer hardware, such as, for example, one or more processors (including Central Processing Units (CPUs), Graphical Processing Units (GPUs), and Complex Programmable Logic Devices (CPLDs)) and system memory, as discussed in greater detail below. Implementations also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, in response to execution at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the described aspects may be practiced in network computing environments with many types of computer system configurations, including, personal computers, desktop computers, laptop computers, message processors, hand-held devices, wearable devices, multicore processor systems, multi-processor systems, microprocessor-based or programmable consumer electronics, network PCs, minicomputers, mainframe computers, Complex Programmable Logic Devices (CPLDs), Programmable Array Logic (PAL) devices, Field-Programmable Gate Arrays (FPGAs), routers, switches, and the like. The described aspects may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The described aspects can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources (e.g., compute resources, networking resources, and storage resources). The shared pool of configurable computing resources can be provisioned via virtualization and released with low effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the following claims, a "cloud computing environment" is an environment in which cloud computing is employed.

In this description and the following claims, a "power supply unit" is defined as a power device that converts mains current to regulated DC power for digital components, such as, for example, computers, routers, switches, etc. Regulated DC power can be at one or more different voltages. The mains current can be alternating current (AC) or direct current (DC). Mains current can be at the same voltage as one of the voltages of regulated DC power (e.g., when mains current is DC). On the other hand, mains current can be at a voltage that differs from any voltages of regulated DC power (e.g., when mains current is DC or AC). Regulated DC power can include one or more voltages compatible with various digital components, such as, for example, any of +3.3 V, +5 V, −5 V, +12 V, and +48V. However, other voltages are also possible. Power supply unit is defined to include switched-mode power supplies. In this description and the following claims a power supply unit may be referred to as a PSU.

Aspects of the invention increase the likelihood of gracefully shutting down a server and associated components when mains power (either AC or DC) is lost for a specified amount of time (e.g., an amount of time beyond transition to generator power). Aspects of the invention help insure that Power Loss Protection (PLP) capacitors, Non-Volatile Dual In-line Memory Module (NVDIMM), and Peripheral Component Interconnect Express (PCIe) reset is triggered on power down when mains power is lost and battery is close to depletion.

FIG. 1 illustrates an example computer architecture 100 that facilitates remediating power loss at a server. Referring to FIG. 1, computer architecture 100 includes server 101, PSU 106, and battery 107. Server 101, PSU 106, and battery 107 can be connected to (or be part of) a network, such as, for example, a Local Area Network ("LAN"), a Wide Area Network ("WAN"), and even the Internet. Accordingly, server 101, PSU 106, and battery 107 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

In one aspect, server 101, PSU 106, and battery 107 are included in a rack within a data center. The rack can also include other components, such as, for example, other servers, other PSUs, other batteries, storage devices (e.g., Solid State Drives (SSDs) and/or magnetic hard drives), networking equipment, etc. The data center can also include one or more additional racks that contain servers, PSUs, batteries, storage devices, networking equipment, etc.

PSU 106 receives mains power connection 111 (AC) and converts the mains power connection 111 (AC) to power connection 113 (DC). Voltages and frequencies of mains power systems can vary by country. Mains power connection 111 (AC) can range from 100-240 Volts (expressed as root-mean-square) operating and 50 Hz or 60 Hz. PSU 106 can be adapted to country of operation. Power connection 113 (DC) can be low-voltage regulated DC power for digital components, including server 101.

In another aspect, mains power connection 111 is DC. In this other aspect, mains power connection 111 can include one or more DC voltages (e.g., 24V or 12V, +5V, −5V, Gnd). Power supply unit 106 can convert DC voltage levels, limit current, etc. for battery 107 and/or server 101.

PSU 106 can be configured to emit various messages and/or alerts indicative of status. For example, when power is lost at mains power connection 111, PSU 106 can send an alert indicating the power loss. When power is restored at mains power connection 111, PSU 106 can clear the alert.

Battery 107 can provide backup power for power connection 113. For example, battery 107 can provide power connection 113 when mains power connection 111 is lost. Based on capacity, battery 107 can provide power connection 113 for a specified amount of time. The specified amount of time can be sufficient to allow a graceful shutdown of components associated with server 101 before battery 107 is depleted. As such, battery 107 can also be used to increase reliability of power connection 113 during transient conditions in mains power connection 111. For example, battery 107 can provide power connection 113 when flickers and/or fluctuations occur in mains power connection 111.

Server 101 further includes management controller 102 and watchdog module 103. Management controller 102 can be a baseboard management controller (BMC) used in an Intelligent Platform Management Interface (IPMI). Management controller 102 can be a microcontroller embedded on the motherboard of server 101. Management controller 102 can manage and interface between system management software and platform hardware. Management controller 102 can monitor platform hardware, such as, for example, PSU 106, and send alerts to system administrators.

For example, management controller 102 can receive an alert from PSU 106 indicating power loss at mains power connection 111. When responsive, management controller 102 can receive the alert and handle the alert. When handling an alert, management controller 102 may clear the alert. Management controller 102 can respond to a loss of power by gracefully shutting down components associated with server 101 (e.g., copying the contents of RAM to more durable storage) prior to depletion of battery 107. A graceful shutdown can include Asynchronous Dynamic Refresh (ADR), PCIe Reset (PERST), etc.

Watchdog module 103 is configured handle graceful shutdown of components associated with server 101 when management controller 102 is non-responsive (e.g., when management controller 102 is being updated, is hung, etc.). Watchdog module 103 can monitor PSU 106. As such, watchdog module 103 can also receive alerts from PSU 106 indicating power loss at mains power connection 111. When an alert indicating power loss is received, timer 104 starts a countdown timer. If the alert remains active and unacknowledged by management controller 102 for a specified amount of time, watchdog module 103 initiates a graceful shutdown of components associated with server 101.

An alert from PSU 106 can indicate that server 101 is being powered by battery 107. As such, a timer value for timer 104 can be configured so that watchdog module 103 initiates a graceful shutdown prior to depletion of battery 107. If at any time during a countdown timer an alert from PSU 106 is cleared (either by PSU 106 or by management controller 102) or management controller 102 acknowledges watchdog module 103, timer 104 aborts the countdown timer.

In one aspect, watchdog module 103 is implemented in a Complex Programmable Logic Device (CPLD). However, watchdog module 103 can also be implemented in other types of programmable logic circuitry.

PSU 106 and server 101 can communicate over data connection 112 (a physical interface). Data connection 112 can be any of a variety of communication mechanisms including: a System Management Bus (SMB), an RS-232 serial console, address and data lines, an Inter-Integrated Circuit (PC) bus, a Serial Peripheral Interface (SPI) bus, an Intelligent Platform Management Bus (IPMB), Ethernet, or power line communication. Data connection 112 enables management controller 102 and watchdog module 103 to receive alerts from power supply unit 106.

Figure 2:
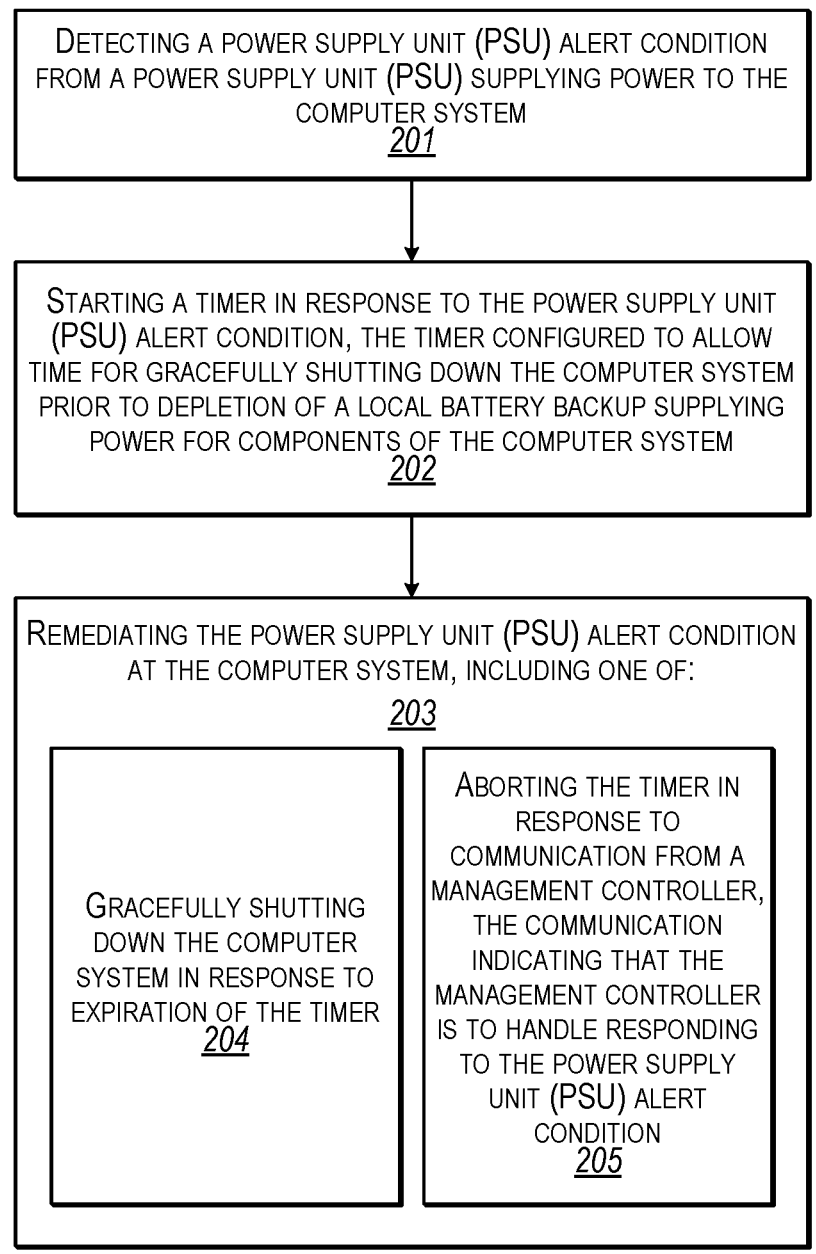
FIG. 2 illustrates a flow chart of an example method for remediating power loss at a server.

FIG. 2 illustrates a flow chart of an example method for remediating power loss at a server. Method 200 will be described with respect to the components and data of computer architecture 100.

Method 200 includes detecting a power supply unit (PSU) alert condition from a power supply unit (PSU) supplying power to the computer system (201). For example, watchdog module 103 can detect alert 121 (on via data connection 112). When responsive, management controller 102 can also receive alert 121. However, if management controller 102 is updating, hung, or operating inappropriately, management controller 102 may not receive alert 121. Alert 121 can indicate power loss at mains power connection 111.

Method 200 includes starting a timer in response to the power supply unit (PSU) alert condition, the timer configured to allow time for gracefully shutting down the computer system prior to depletion of a local battery backup supplying power for components of the computer system (202). For example, watchdog module 103 can start timer 104 in response to alert 121. Timer 104 can be based on timer value 123. Timer value 123 can define an amount of time sufficient to allow for gracefully shutting down server 101 and associated components prior to depletion of battery 107.

Method 200 includes remediating the power supply unit (PSU) alert condition at the computer system, (203). For example, watchdog module 103 can remediate alert 121. In one aspect, watchdog module 103 sends notification 127 to management controller 102 to indicate watchdog module 103 is handling alert 121.

Remediating the power supply unit (PSU) alert condition, includes one of: gracefully shutting down the computer system in response to expiration of the timer (204) and aborting the timer in response to communication from a management controller, the communication indicating that the management controller is to handle responding to the power supply unit (PSU) alert condition (205). For example, watchdog module 103 can send shutdown commands 126 (e.g., ADR and/or PERST) to gracefully shutdown server 101 and associated components in response to expiration of timer 104.

Alternately, watchdog module 103 can abort 124 timer 104 in response to communication from management controller 102. In one aspect, management controller 102 sends acknowledgment 128 to watchdog module 103. Acknowledgment 128 indicates to watchdog module 103 that management controller 102 is handling alert 121. In response to receiving acknowledgement 128, timer 104 is aborted.

In another aspect, management controller 102 sends clear alert 122 (via data connection 112) to PSU 106. In response to clear alert 122, PSU 106 can deactivate alert 121. In a further aspect, PSU 106 deactivates alert 121 upon mains power connection 111 being restored. In response to detecting deactivation of alert 121, timer 104 is aborted. When alert 121 is deactivated, watchdog module 103 infers that management controller 102 is handling alert 121 or that mains power connection 111 is restored. When management controller 102 handles alert 121, management controller 102 can send shutdown commands 126 (e.g., ADR and/or PERST) to gracefully shutdown server 101 and associated components.

Thus, in some aspects, when AC power is lost a PSU alert is asserted. A watchdog module receives the alert and starts a shutdown timer based on the PSU alert. If the PSU alert remains active for a period of time (e.g., 45 seconds), the watchdog module does a graceful shutdown (e.g., PLP, PERST, and ADR). The period of time is programmable and can be varied, for example, based on battery capacity.

If at any point the PSU alert is deactivated by a management controller (or the PSU), the watchdog module aborts the shutdown timer. The PSU alert is sticky such that when the PSU alert is cleared the watchdog module knows that the management module is handling the PSU alert.

In other aspects, when AC is lost, a management controller receives a PSU alert. The management controller monitors the PSU. After riding the battery for a period of time (e.g., 45 seconds), the management controller begins a graceful shutdown. The period of time is programmable and can be varied, for example, based on battery capacity. If the management controller is unresponsive (e.g., updating or hung), a watchdog module can assist with a graceful shutdown prior to battery depletion.

The watchdog module can also receive the PSU alert and being its own counter to commence graceful shutdown. If the management controller is responsive (alive) it can stop the watchdog module countdown by sending an ACK to the watchdog module.

Accordingly, either a management module (e.g., BMC) or watchdog module can gracefully shutdown a server and associated components prior to depletion of a battery. A management module can have primary responsibility for orchestrating a graceful shutdown in response to power loss. When the management module is unresponsive, the watchdog module provides backup functionality for orchestrating a graceful shutdown in response to power loss. As such, data can be saved from RAM to more durable storage even when the management module is unresponsive.

In one aspect, a system includes a power supply unit (PSU), a battery, and a computer system (e.g., a server). The power supply unit has mains power (e.g., alternating current (AC) or direct current (DC)) input and direct current (DC) output. The direct current (DC) output provides a specified direct current (DC) voltage. The battery provides the specified direct current (DC) voltage. The battery is configured to provide backup power to components connected to the direct current output when problems providing the direct current output occur.

The computer system is connected to the direct current output and connected to the battery. The computer system includes one or more processors, system memory, a management controller, and a watchdog module. The management controller monitors the status of the power supply unit (PSU). The management controller is configured to gracefully shut down the computer system when a problem with the power supply unit (PSU) is detected.

The watchdog module is configured to start a timer when the problem with the power supply unit (PSU) is detected.

The watchdog module is configured to gracefully shut down the computer system in response to expiration of the timer. The watchdog module is configured to abort the timer in response to communication from the management controller.

In another aspect, a method for remediating a power supply unit (PSU) alert condition at the computer system is performed. A power supply unit (PSU) alert condition is detected from a power supply unit (PSU) supplying power to the computer system. A timer is started in response to the power supply unit (PSU) alert condition. The timer is configured to allow time for gracefully shutting down the computer system prior to depletion of a local battery backup supplying power for components of the computer system.

The power supply unit (PSU) alert condition is remediated at the computer system, including one of: gracefully shutting down the computer system in response to expiration of the timer or aborting the timer in response to communication from a management controller. The communication indicating that the management controller is to handle responding to the power supply unit (PSU) alert condition.

In a further aspect, a computer program product for use at a computer system includes one or more computer storage devices having stored thereon computer-executable instructions that, in response to execution at a processor, cause the computer system to implement a method for remediating a power supply unit (PSU) alert condition at the computer system is performed.

The computer program product includes computer-executable instructions that, in response to execution at a processor, cause the computer system to detect a power supply unit (PSU) alert condition from a power supply unit (PSU) supplying power to the computer system. The computer program product includes computer-executable instructions that, in response to execution at a processor, cause the computer system to start a timer in response to the power supply unit (PSU) alert condition. The timer is configured to allow time for gracefully shutting down the computer system prior to depletion of a local battery backup supplying power for components of the computer system.

The computer program product includes computer-executable instructions that, in response to execution at a processor, cause the computer system to remediate the power supply unit (PSU) alert condition at the computer system, including one of the following: graceful shut down of the computer system in response to expiration of the timer or abort the timer in response to communication from a management controller. The communication indicating that the management controller is to handle responding to the power supply unit (PSU) alert condition.

The present described aspects may be implemented in other specific forms without departing from its spirit or essential characteristics. The described aspects are to be considered in all respects only as illustrative and not restrictive. The scope is, therefore, indicated by the appended claims rather than by the foregoing description. All changes which come within the meaning and range of equivalency of the claims are to be embraced within their scope.

What is claimed is:

1. A computer system, the computer system comprising: one or more processors; and
system memory coupled to the one or more processors, the system memory storing instructions that are executable by the one or more processors,
wherein the one or more processors executing the instructions stored in the system memory cause the one or more processors to:

detect a power supply unit (PSU) alert at the computer system from a PSU supplying power to the computer system;

start a timer at a secondary shutdown module of the computer system which has secondary responsibility for gracefully shutting down the computer system, the timer configured to allow time for the secondary shutdown module to gracefully shutdown the computer system prior to depletion of a battery supplying backup power for components of the computer system;

receive an acknowledgment at the secondary shutdown module from a management controller which has primary responsibility for gracefully shutting down the computer system, the acknowledgement indicating that the management controller is gracefully shutting down the computer system based on the detected PSU alert at the computer system; and in response to receiving the acknowledgement that the management controller is handling the graceful shutdown, abort the timer corresponding to the secondary responsibility to gracefully shut down the computer via the secondary shutdown module.

2. The computer system of claim 1, wherein the one or more processors are configured to start the timer in response to a failure alert signal from the PSU.

3. The computer system of claim 2, wherein the PSU alert is received over a data connection between the PSU and the secondary shutdown module.

4. The system of claim 1, wherein the one or more processors are configured to start the timer in response to the PSU alert being detected via one of: an RS-232 bus, an Inter-Integrated Circuit ($I^2C$) bus, or a System Management Bus (SMB).

5. The system of claim 1, wherein the one or more processors are further configured to copy data stored in the system memory to persistent storage during the graceful shutdown via the management controller.

6. The system of claim 1, wherein the one or more processors are further configured to gracefully shut down the computer system including:
initiate a PCIe reset for the computer system; and
initiate an Asynchronous Dynamic Refresh for the computer system.

7. The system of claim 1, wherein the one or more processors are further configured to send a notification to a Baseboard Management Controller (BMC) included in an Intelligent Platform Management Interface (IPMI) at the computer system.

8. The system of claim 1, wherein the secondary shutdown module comprises a circuit that is separate and distinct from circuitry of the management controller.

9. The system of claim 1, wherein the management controller comprises a baseboard management controller (BMC) and the secondary shutdown module comprises a programmable logic device (PLD) that is independent of the BMC.

10. The system of claim 1, wherein the received acknowledgement at the secondary shutdown module provides notice to the secondary shutdown module that the management controller is aware of the PSU alert at the computer system.

11. The system of claim 1, wherein the secondary shutdown module sets an amount of time within the timer to prevent depletion of battery power of a battery powering the computer system.

12. A method for use at a computer system, the method comprising:

detecting a power supply unit (PSU) alert at the computer system from a PSU supplying power to the computer system;

starting a timer at a secondary shutdown module of the computer system which has secondary responsibility for gracefully shutting down the computer system, the timer configured to allow time for the secondary shutdown module to gracefully shut down the computer system prior to depletion of a battery supplying backup power for components of the computer system;

sending a notification of the PSU alert to a management controller at the computer system, the management controller having primary responsibility for gracefully shutting down the computer system;

determining that the management controller having primary responsibility for gracefully shutting down the computer system has failed to provide a response to the secondary shutdown module within a predetermined period of time based on the timer; and gracefully shutting down the computer system via the secondary shutdown module due to the management controller being unresponsive.

13. The method of claim 12, wherein detecting the PSU alert comprises detecting an alert indicating that power was lost at a mains power connection.

14. The method of claim 12, wherein starting the timer comprises starting the timer in response to detecting activation of the PSU alert from the PSU.

15. The method of claim 12, wherein starting the timer comprises starting the timer in response to detecting activation of the PSU alert received via one of: an RS-232 bus, an Inter-Integrated Circuit (I²C) bus, or a System Management Bus (SMB).

16. The method of claim 12, wherein gracefully shutting down the computer system comprises copying data stored in Random Access Memory (RAM) to persistent storage in response to expiration of the timer.

17. The method of claim 12, wherein gracefully shutting down the computer system in response to expiration of the timer comprises:

initiating a PCIe reset for the computer system; and initiating an Asynchronous Dynamic Refresh for the computer system.

18. A method for use at a computer system, the method comprising:

detecting a power supply unit (PSU) alert at the computer system from a PSU supplying power to the computer system;

starting a timer at a secondary shutdown module of the computer system which has secondary responsibility for gracefully shutting down the computer system, the timer configured to allow time for the secondary shutdown module to gracefully shut down the computer system prior to depletion of a battery supplying backup power for components of the computer system;

receiving an acknowledgment at the secondary shutdown module from a management controller which has primary responsibility for gracefully shutting down the computer system, the acknowledgement indicating the management controller is gracefully shutting down the computer system based on the detected PSU at the computer system; and in response to receiving the acknowledgement that the management controller is handling the graceful shutdown, aborting the timer corresponding to the secondary responsibility to gracefully shut down the computer via the secondary shutdown module.

19. The method of claim 18, wherein starting the timer in comprises starting the timer in response to the PSU alert being received from the PSU.

20. The method of claim 18, wherein detecting the PSU alert comprises receiving the PSU alert over a data connection connecting the PSU and the secondary shutdown module.

21. The method of claim 18, further comprising copying data stored in system memory to persistent storage during the graceful shutdown by the management controller.

* * * * *